United States Patent
Ogasawara et al.

(10) Patent No.: US 6,852,448 B2
(45) Date of Patent: Feb. 8, 2005

(54) NICKEL ELECTRODE FOR ALKALINE SECONDARY BATTERY AND ALKALINE SECONDARY BATTERY

(75) Inventors: Takeshi Ogasawara, Hirakata (JP); Yuki Morikawa, Tokushima (JP); Mitsunori Tokuda, Tokushima (JP); Mutsumi Yano, Hirakata (JP); Shin Fujitani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 416 days.

(21) Appl. No.: 10/053,724

(22) Filed: Jan. 24, 2002

(65) Prior Publication Data

US 2002/0172863 A1 Nov. 21, 2002

(30) Foreign Application Priority Data

Jan. 30, 2001 (JP) ........................... 2001-021579
Sep. 10, 2001 (JP) ........................... 2001-273152

(51) Int. Cl.$^7$ ................................ H01M 4/32
(52) U.S. Cl. .................... 429/223; 429/232; 429/231.5; 429/233; 429/206; 427/126.1
(58) Field of Search ................ 429/223, 232, 429/231.5, 233, 206; 427/126.1

(56) References Cited

U.S. PATENT DOCUMENTS 6,083,642 A * 7/2000 Kato et al. ................. 429/223

FOREIGN PATENT DOCUMENTS

| EP | 0 460 425 A2 | | 12/1991 |
|---|---|---|---|
| EP | 0 817 291 A2 | | 1/1998 |
| EP | 0 902 490 A2 | | 3/1999 |
| EP | 1 113 512 A1 | | 7/2001 |
| JP | 7-45282 | | 2/1995 |
| JP | 8-222213 | | 8/1996 |
| JP | 0 833 397 | | 4/1998 |
| JP | 10-149821 | | 6/1998 |
| JP | 11-176432 | * | 7/1999 |
| JP | 2000-133302 | * | 5/2000 |

OTHER PUBLICATIONS

Patent Abstracts of Japan vol. 013, no. 381 (E–810), Aug. 23, 1989 and JP 01 132065 A (Sanyo Electric Co Ltd), May 24, 1989 *abstract*.

Database WPI, Section Ch, Week 199645, Derwent Publications Ltd., London, GB; AN 1996–448220, XP002199048 & JP 08 222213 A (Hitachi Maxell KK), Aug. 30, 1996 *abstract*.

* cited by examiner

*Primary Examiner*—Laura Weiner
(74) *Attorney, Agent, or Firm*—Westerman, Hattori, Daniels & Adrian, LLP (57) ABSTRACT

The nickel electrode for alkaline secondary battery according to the present invention is obtained by applying a paste containing active material particles comprising nickel hydroxide to a conductive substrate and drying the paste on the conductive substrate. In the above-mentioned nickel electrode for alkaline secondary battery, a conductive layer comprising sodium-containing cobalt oxide is formed on a surface of the active material particles and tungsten powder and/or tungsten compound powder is added on the active material particles.

14 Claims, 1 Drawing Sheet

Fig 1

NICKEL ELECTRODE FOR ALKALINE SECONDARY BATTERY AND ALKALINE SECONDARY BATTERY

BACKGROUND OF THE INVENTION

1. Field of the Invention

The present invention relates to an alkaline secondary battery such as a nickel-hydrogen secondary battery and a nickel-cadmium secondary battery and the like, and to a nickel electrode for alkaline secondary battery used for a positive electrode of the alkaline secondary battery as described above, and in particular, is characterized in that charge/discharge cycle performance of the alkaline secondary battery under high temperature conditions is improved upon bettering the nickel electrode for alkaline secondary battery obtained by applying a paste containing active material particles comprising nickel hydroxide to a conductive substrate and then drying the paste on the conductive substrate.

2. Description of the Related Art

A conventional alkaline secondary battery such as a nickel-hydrogen secondary battery and nickel-cadmium secondary battery, has used as a positive electrode a nickel electrode for alkaline secondary battery using nickel hydroxide as the active material.

In the above-mentioned nickel electrode for alkaline secondary battery, conductivity of nickel hydroxide used as the active material is low. Accordingly, a sintered nickel electrode has been conventionally used obtained by impregnating a sintered substrate prepared by filling a conductive substrate such as a punched steel plate and the like with nickel powder and then sintering the conductive substrate having the nickel powder filled therein, with nickel hydroxide as the active material.

However, in the case of the sintered nickel electrode as described above, a problem exists. Bond between powder in nickel powder is weak, whereby nickel powder drops easily from the conductive substrate when a porosity in the sintered substrate is high. Therefore, a porosity in the sintered substrate can not be higher than around 80% on practical use, and thereby it is impossible to fill sufficiently nickel hydroxide as the active material, making it difficult to obtain an alkaline secondary battery having large capacity.

Further, another problem exists. In the case of the above-mentioned sintered nickel electrode, a filling density of the active material is generally small due to the use of the conductive substrate such as the punched steel plate. Additionally, pores of nickel powder formed by sintering are as small as not more than 10 $\mu$m. Therefore, in filling the active material, a solution impregnating method of repeating cycles of laborious process needs to be adapted, whereby productivity of filling is degraded.

As a result, a paste-type nickel electrode for alkaline secondary battery has become to be used obtained by applying a paste prepared by adding an aqueous solution of a binding agent such as methyl cellulose and the like to the active material particles comprising nickel hydroxide and then kneading a resultant mixture, to a conductive substrate having a large porosity such as nickel substrate foam and the like, and then, drying the paste on the conductive substrate.

In the case of the paste-type nickel electrode for alkaline secondary battery, the conductive substrate having a porosity of not less than 95% may be used. Therefore, it is possible to obtain an alkaline secondary battery having large capacity upon filling the sintered substrate with a large amount of active material and to facilitate filling the conductive substrate with active material. As a result, productivity of filling is improved.

However, in the paste-type nickel electrode for alkaline secondary battery, the conductive substrate is filled with a large amount of active material. Accordingly, when the conductive substrate having a large porosity is used, there exists a problem that collectivity of the conductive substrate is degraded, and thereby, rate of utilization of the active material is also degraded.

Therefore, in recent years, in the paste-type nickel electrode for alkaline secondary battery, conductivity inside an electrode has been improved, to increase the rate of utilization of the active material upon adding cobalt metal and a cobalt compound comprising cobalt oxide and cobalt hydroxide which are conductive agents to the active material particles comprising nickel hydroxide and then oxidizing by charging the above-mentioned cobalt metal and cobalt compound into cobalt oxyhydroxide ($\beta$-CoOOH).

However, even in the case where cobalt metal and a cobalt compound which are conductive agents are added to the active material particles comprising nickel hydroxide, when charge is performed to an alkaline secondary battery using the paste-type electrode for alkaline secondary battery as a positive electrode of an alkaline secondary battery, oxygen evolution overvoltage of the positive electrode is low. Accordingly, there exists a problem that a side reaction of oxygen evolution reaction occurs in addition to charge reaction of nickel hydroxide oxidized into nickel oxyhydorxide, whereby charge performance is degraded.

In this connection, in the paste-type nickel electrode for alkaline secondary battery, proposals have been made in the art as follows. For instance, Japanese Laid-Open No. Hei 8-222213 discloses a nickel electrode for alkaline secondary battery aimed at the improvement in charge performance under high temperature conditions upon increasing oxygen evolution overvoltage of the positive electrode by adding conductive agents comprising cobalt metal and a cobalt compound to a surface of active material particles comprising nickel hydroxide as well as by adding a tungsten compound and the like to the active material particles.

However, in the case of using the paste-type nickel electrode for alkaline secondary battery obtained by adding a tungsten compound and the like in addition to the conductive agents comprising cobalt metal and a cobalt compound to the surface of the active material particles comprising nickel hydroxide, when charge/discharge is performed under high temperature conditions, discharge depth at discharge is large. Accordingly, cobalt oxyhydroxide into which cobalt metal and a cobalt compound are oxidized as described above, is reduced into cobalt hydroxide. Said cobalt hydroxide is included as solid solution into an alkaline electrolyte solution of the alkaline secondary battery, after which, is precipitated on the surface of the active material particles.

In the case where cobalt hydroxide is included as solid solution into the alkaline electrolyte solution and is precipitated as described above, speed of the above-mentioned process of dissolving and precipitating is high. Therefore, when the charge/discharge is repeatedly performed under high temperature conditions, cobalt hydroxide is not precipitated uniformly on the surface of the active material particles comprising nickel hydroxide. Accordingly, cobalt hydroxide is unevenly precipitated on the active material particles and part of cobalt hydroxide is diffused into pores of the active material particles. Consequently, there exists a problem that conductivity of the nickel electrode of alkaline secondary battery is gradually decreased, and thereby, charge/discharge cycle performance under high temperature conditions is also degraded.

SUMMARY OF THE INVENTION

An object of the present invention is to improve characteristic of a nickel electrode for alkaline secondary battery obtained by applying a paste containing active material particles comprising nickel hydroxide to a conductive substrate and then drying the paste on the conductive substrate.

Another object of the present invention is, in the case of charge/discharge under high temperature conditions an alkaline secondary battery using as a positive electrode the nickel electrode for alkaline secondary battery, to prevent discharge capacity of the alkaline secondary battery from decreasing and to improve discharge/charge cycle performance under high temperature conditions.

The nickel electrode for alkaline secondary battery according to the present invention is obtained by applying a paste containing active material particles comprising nickel hydroxide to a conductive substrate and then drying the paste on the conductive substrate, and is also obtained by forming a conductive layer comprising sodium-containing cobalt oxide on a surface of the active material particles as well as by adding tungsten powder or tungsten compound powder to the active material particles.

Further, as in the nickel electrode for alkaline secondary battery according to the present invention, when the conductive layer comprising sodium-containing cobalt oxide is provided on the surface of the active material particles comprising nickel hydroxide, electrical conductivity of the sodium-containing cobalt oxide is higher than when cobalt metal and a cobalt compound are used, and thereby, collectivity inside an electrode is higher, which increases rate of utilization of the active material.

Additionally, as in the nickel electrode of alkaline secondary battery according to the present invention, when the conductive layer comprising sodium-containing cobalt oxide is provided on the surface of the active material particles comprising nickel hydroxide as well as tungsten powder and/or tungsten compound powder is added to the active material particles, in the case where charge/discharge is performed under high temperature conditions to the alkaline secondary battery using the nickel electrode for alkaline secondary battery, the sodium-containing cobalt oxide is prevented from being reduced into cobalt hydroxide at discharge, to be restrained from being included as solid solution into the alkaline electrolyte solution of the alkaline secondary battery. In addition, even in the case where part of the containing cobalt oxide is reduced into cobalt hydroxide, speed at which cobalt hydroxide is included as solid solution in the alkaline electrolyte solution and is precipitated becomes slow due to the influence of tungsten powder and/or tungsten compound powder. Accordingly, cobalt hydroxide is prevented from being unevenly precipitating on the surface of the active material particles as well as part of cobalt hydroxide is prevented from being diffused into pores of the active material particles. As a result, charge/discharge cycle performance under high temperature conditions is improved.

In the nickel electrode for alkaline secondary battery according to the present invention, in forming the conductive layer comprising sodium-containing cobalt oxide to the surface of the active material particles comprising nickel hydroxide, cobalt metal powder, cobalt hydroxide powder, cobalt monoxide powder, and cobalt oxyhydroxide powder are mixed with the active material particles to prepare a mixture. Alternatively, layers of cobalt metal, cobalt hydroxide, cobalt monoxide and cobalt oxyhydroxide are formed on the surface of the active material particles. Afterward, an aqueous solution of sodium hydroxide is added to the aforementioned resultant mixture or layers, and then is subject to heat-treating at the temperature of 50 to 200° C. under the presence of oxygen, to obtain the above-mentioned conductive layer.

The reason why the temperature at which the heat-treating is performed as described above is set in the range of 50 to 200° C. is that, when the heat-treating temperature is less than 50° C., $CoHO_2$ low in electric conductivity is precipitated while the heat-treating temperature is more than 200° C., tricobalt tetroxide $Co_3O_4$ low in electric conductivity is precipitated, which indicates that in both of the case where the heat-treating temperature is less than 50° C. and more than 200° C., a conductive layer high in conductivity can not be obtained. Further, when cobalt oxyhydroxide particles are added to the surface of the active material particles or a layer of cobalt oxyhydroxide is formed the aforementioned surface, $CoHO_2$ is not precipitated upon being heat-treated at the temperature of less than 50° C. However, sodium is hard to be contained in the conductive layer containing cobalt oxide, and thereby, a conductive layer high in conductivity cannot be obtained. Further, in heat-treating as described above, it should be noted that the time period of the heat-treating is not particularly limited and variation and modification thereto can be made in accordance with the concentration of used sodium hydroxide and the temperature for heat-treating and the like. Conventionally, the time period of the heat-treating is set 0.5 to 10 hours.

Further, in the case where the conductive layer comprising sodium-containing cobalt oxide is formed on the surface of the active material particles comprising nickel hydroxide as shown above, a chemical structure of the sodium-containing cobalt oxide is uncertain. However, electric conductivity thereof is extremely high. In this connection, it is to be noted that the sodium-containing cobalt oxide is not a mere mixture of cobalt oxide and sodium but an interlayer compound having a structure of sodium being interposed into cobalt oxide crystals.

Furthermore, in forming layers of cobalt metal, cobalt hydroxide, and cobalt monoxide on the surface of the active material particles comprising nickel hydroxide, cobalt metal powder, cobalt hydroxide powder, and cobalt monoxide powder are added to nickel hydroxide powder, and are dry-blended by a compression powder granulator under an inactive gas atmosphere, to form the above-mentioned layers. The aforementioned process of dry-blending by compression granulator under inactive gas atmosphere is a mechanical charge method.

Additionally, in forming a layer of cobalt hydroxide on the surface of the active material particles comprising nickel hydroxide, nickel hydroxide powder is added to an aqueous solution of cobalt salt such as cobalt sulfate and the like. A resultant mixture is dropped with an alkaline aqueous solution such as an aqueous solution of sodium hydroxide to adjust the pH to around 11, upon being agitated. Afterward, the mixture of an aqueous solution of cobalt salt, nickel hydroxide powder, and an alkaline aqueous solution is reacted for a predetermined period upon being agitated, to precipitate cobalt hydroxide on the surface of the nickel hydroxide particles.

Moreover, in forming a layer of cobalt oxyhydroxide on the surface of the active material particles comprising nickel hydroxide, a layer of cobalt hydroxide is formed on the surface of the active material particles comprising nickel hydroxide as described above, and the layer of cobalt hydroxide formed on the surface is reacted with an aqueous solution of hydrogen peroxide heated up to around the temperature of 40° C., to oxidize cobalt hydroxide. Thus is formed the layer of cobalt hydroxide.

In forming the conductive layer comprising sodium-containing cobalt oxide on the surface of the active material particles as described above, when a weight ratio of the conductive layer to the active material particles is small, it is impossible to increase sufficiently conductivity of the nickel electrode for alkaline secondary battery. On the other hand, when a weight ratio of the conductive layer to the active material particles is too larger, a ratio of nickel hydroxide in the nickel electrode for alkaline secondary battery is small, whereby decreasing discharge capacity thereof. In this connection, a weight ratio of cobalt element in the conductive layer to the active material particles comprising nickel hydroxide is preferably set in the range of 1 to 10 wt %.

In addition, in the conductive layer comprising sodium-containing cobalt oxide, when a weight ratio of sodium element in the sodium-containing cobalt oxide is too large or too small, the sodium-containing cobalt oxide is easily reduced into cobalt hydroxide at discharge under high temperature. Therefore, it is preferable that a weight ratio of sodium element in the sodium-containing cobalt oxide is set in the range of 0.1 to 10 wt %.

Furthermore, in adding tungsten powder and/or tungsten compound powder to the surface of the active material particles having the above-mentioned conductive layer formed thereon, when a weight ratio of the tungsten powder and/or the tungsten compound powder to be added is too small, it is impossible to prevent sufficiently charge/discharge cycle performance from decreasing under high temperature conditions. On the other hand, when the weight ratio is too large, a ratio of nickel hydroxide in the nickel electrode for alkaline secondary battery is small, whereby decreasing discharge capacity thereof. On this account, it is preferable that the weight ratio of tungsten element in the tungsten powder and/or the tungsten compound powder to be added to a total weight of active material particles comprising nickel hydroxide and having the conductive layer formed thereon is set in the range of 0.2 to 4 wt %. Further, $WO_2$ and $WO_3$ and the like may be used as the tungsten compound.

When a particle diameter of said tungsten or compound thereof is large, the contacting area of tungsten powder and/or tungsten compound powder with the surface of the active material particles having the conductive layer formed thereon is small, and thereby, sufficient efficiency is not obtained. Accordingly, it is preferable that as tungsten powder and/or tungsten compound powder, that having an average particle diameter of not more than 100 μm is used.

Further, in the nickel electrode for alkaline secondary battery according to the present invention, it is preferable that at least one element selected from the group consisting of zinc, cobalt, calcium, magnesium, aluminum, manganese, yttrium, and ytterbium is included as solid solution in the active material particles comprising nickel hydroxide. Further, the selected element is included as solid solution in the active material particles, potassium ions and the like in an alkaline electrolyte solution is prevented from being intercalated into nickel hydroxide crystals as the active material, to restrain a decrease in charge/discharge capacity due to dryout of the alkaline electrolyte solution. In particular, at least one element selected from zinc and cobalt is included as solid solution, potassium ions and the like in an alkaline electrolyte solution is further prevented from being intercalated into nickel hydroxide crystals as the active material, to further restrain a decrease in charge/discharge capacity. When a ratio of the selected element to be included as solid solution in the active material particles comprising nickel hydroxide is large, a ratio of nickel hydroxide is small, and thereby, battery capacity is decreased. Therefore, a ratio of the selected element to a total sum of nickel hydroxide and the selected element is preferably set not more than 10% by atom.

In addition, in the nickel electrode for alkaline secondary battery according to the present invention, it is preferable that at least one element powder and or its compound powder selected from the group consisting of yttrium, ytterbium, calcium, aluminum, erbium, gadolinium, thulium, lutetium, niobium, and zinc in addition to tungsten powder and/or tungsten compound powder are added to the surface of the active material particles having the conductive layer comprising sodium-containing cobalt oxide formed thereon. Further, when the selected element powder or its compound powder is added, charge/discharge cycle performance under high temperature conditions is further improved. In particular, yttrium powder or yttrium compound powder is added, charge/discharge cycle performance under high temperature conditions is further improved. Especially, when $Y_2O_3$ powder is added, charge/discharge cycle performance under high temperature conditions is extremely improved.

In the nickel electrode for alkaline secondary battery according to the present invention, examples of usable conductive substrate having a paste containing active material particles applied thereon include nickel substrate foam, felt metal fiber, punching metal, and the like.

Further, examples of the alkaline secondary battery using for the positive electrode the nickel electrode for alkaline secondary battery include a nickel-hydrogen secondary battery using for a negative electrode a hydrogen absorbing alloy electrode, a nickel-cadmium secondary battery using for a negative electrode a cadmium electrode, and a nickel-zinc secondary battery using for a negative electrode a nickel-zinc secondary battery.

Further, in the alkaline secondary battery, in order to improve charge characteristic under high temperature conditions so that oxygen evolution at excessive charge should be restrained, it is preferable that an alkaline electrolyte solution containing potassium, lithium, and sodium is used. More specifically, it is more preferable that an alkaline electrolyte solution containing 4 to 10 mol/l of potassium hydroxide, 0.1 to 2 mol/l of lithium hydroxide, and 0.2 to 4 mol/l of sodium hydroxide is used.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Now, nickel electrodes for alkaline secondary battery and alkaline secondary batteries using the same for a positive electrode according to the preferred embodiments of the invention will hereinbelow be described in detail while comparative examples will be cited to demonstrate that charge/discharge cycle performance under high temperature conditions is improved in alkaline secondary batteries according to the preferred embodiments hereof. It should be appreciated that the nickel electrodes for alkaline secondary battery and the alkaline secondary batteries of the invention are not limited to following EXAMPLES but variations and modifications thereto may be made within the scope and spirit of the invention.

EXAMPLE 1

In EXAMPLE 1, a nickel electrode for alkaline secondary battery was fabricated in the following manner.
(Preparation of Nickel Electrode for Alkaline Secondary Battery)

100 g. of nickel hydroxide powder as an active material was added to a 1 liter of aqueous solution of cobalt sulfate having 10.5 g. of cobalt sulfate included as solid solution therein, to prepare a mixture. The resultant mixture is added with a 10 wt % of aqueous solution of sodium upon being agitated, to adjust the pH to around 11, and the agitation was kept for an hour. Afterward, precipitation was filtered, was rinsed, and was vacuum-dried, to obtain powder wherein a layer of cobalt hydroxide was formed on a surface of nickel hydroxide particles as the active material.

Next, the powder wherein a layer of cobalt hydroxide was formed on the surface of nickel hydroxide particles and a 25 wt % of an aqueous solution of sodium hydroxide were mixed in a weight ratio of 1 to 10, to obtain a mixture. The resultant mixture was heat-treated for 5 hours at the temperature of 90° C., was rinsed, and then, was dried at the temperature of 60° C., to obtain powder wherein a conductive layer comprising sodium-containing cobalt oxide was formed on the surface of nickel hydroxide particles as the active material.

In the case where the conductive layer comprising sodium-containing oxide was formed on the surface of nickel hydroxide particles as the active material, a weight ratio of cobalt element in the conductive layer to the nickel hydroxide particles as the active material was 4 wt %.

Further, in order to determine a weight ratio of sodium in the above-mentioned conductive layer comprising sodium-containing cobalt oxide, cobalt hydroxide powder and a 25 wt % of aqueous solution of sodium hydroxide were mixed in a weight ratio of 1 to 10, to obtain a mixture. A resultant mixture was heat-treated for 5 hours at the temperature of 90° C., was rinsed, and then, was dried at the temperature of 60° C., to prepare sodium-containing cobalt oxide in the same manner as described above. In addition, as to the sodium-containing cobalt oxide, a weight ratio of sodium was determined by atom extinction analysis. A weight ratio of sodium element in the sodium-containing cobalt oxide was 1 wt %, and valence of cobalt determined by oxide-reduction titration was 3.1.

Further, $WO_3$ powder having an average particle diameter of 1 $\mu$m as a tungsten compound and the powder wherein the conductive layer comprising sodium-containing cobalt oxide was formed on the surface of the nickel hydroxide as shown above, were mixed in a weight ratio of 2.52 to 100, to prepare a mixture. Afterward, a 20 part by weight of aqueous solution of methyl cellulose having a concentration of 1 wt % was added as a binding agent to the 100 part by weight of the above-mentioned mixture. The resultant mixture of the $WO_3$ powder, the powder wherein the conductive layer was formed, and the aqueous solution of methyl cellulose was kneaded, to prepare a paste. The paste thus prepared was filled into nickel substrate foam (a porosity:95%, an average pore diameter:200 $\mu$m) as the conductive layer, was dried, and then, was formed by pressure, to prepare a nickel electrode for alkaline secondary battery. It is to be noted that in the nickel electrode for alkaline secondary battery, a weight ratio of tungsten element in the $WO_3$ powder was 2 wt % of a total weight of nickel hydroxide particles wherein the conductive layer comprising sodium-containing cobalt oxide was formed as shown above.

Figure 1:
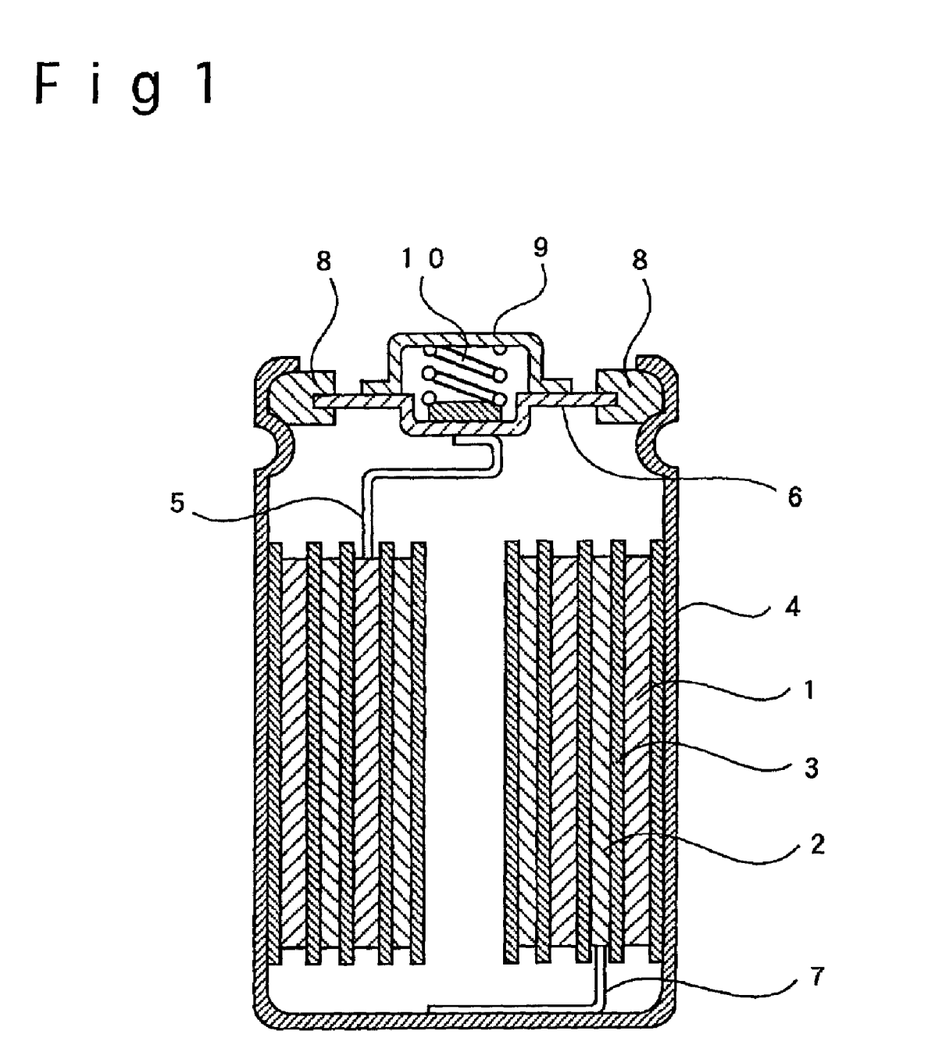
FIG. 1 is a schematic sectional view showing an alkaline secondary battery fabricated in EXAMPLES and COMPARATIVE EXAMPLES of the present invention.

Next, the nickel electrode for alkaline secondary battery was used for a positive electrode while a generally used paste-type cadmium electrode was used for a negative electrode, and polyamide nonwoven fabric was used for a separator, and an aqueous solution having 336.6 g. of KOH, 20.0 g. of NaOH, and 41.9 g. of $LiOH.H_2O$ included as solid solution therein per 1 liter, was used for an alkaline electrolyte solution, to fabricate an alkaline secondary battery of AA-size as shown in FIG. 1. Further, in the above-mentioned alkaline electrolyte solution, a concentration of potassium hydroxide was 6.0 mol/l., that of sodium hydroxide 0.5 mol/l., and that of lithium hydroxide 1.0 mol/l.

In fabricating an alkaline storage battery, as shown in FIG. 1, a separator 3 was interposed between the positive electrode 1 and negative electrode 2, and they were contained in a battery can 4 upon being spirally wound. Afterward, the above-mentioned alkaline electrolyte was pored into the battery can 4, the battery can 4 was sealed, the positive electrode 1 was connected to a sealing cover 6 through a positive electrode lead 5, and the negative electrode 2 was connected to the battery can 4 through a negative electrode lead 7, to electrically separate the battery can 4 and the sealing cover 6 by an insulating packing 8.

A coil spring 10 was provided between the sealing cover 6 and a positive electrode external terminal 9. When the internal pressure of the battery was abnormally increased, the coil spring 10 was compressed, so that gas inside the battery was discharged into the air.

EXAMPLE 2

In EXAMPLE 2, in preparation of a nickel electrode for alkaline secondary battery, powder wherein a conductive layer comprising a sodium-containing oxide was formed on a surface of nickel hydroxide particles as an active material, was obtained in the same manner as in the EXAMPLE 1. Afterward, a nickel electrode for alkaline secondary battery was prepared in the same manner as in EXAMPLE 1 except that W powder having an average particle diameter of 1 $\mu$m and the powder wherein the conductive layer was formed were mixed in a weight ratio of 2 to 100. Moreover, In the nickel electrode for alkaline secondary battery, a weight ratio of tungsten element was 2 wt % of a total weight of the nickel hydroxide particles wherein the conductive layer comprising the sodium-containing cobalt oxide was formed.

Further, the alkaline secondary battery of EXAMPLE 2 was fabricated in the same manner as in the EXAMPLE 1 except that the nickel electrode for alkaline secondary battery thus prepared was used for a positive electrode.

EXAMPLE 3

In EXAMPLE 3, in preparation of a nickel electrode for alkaline secondary battery, powder wherein a conductive layer comprising sodium-containing oxide was formed on a surface of nickel hydroxide particles as an active material was obtained in the same manner as in the EXAMPLE 1.

Afterward, a nickel electrode for alkaline secondary battery was prepared in the same manner as in the EXAMPLE 1 except that WO$_3$ powder having an average particle diameter of 1 μm, W powder having an average particle diameter of 1 μm, and the powder wherein the conductive layer was formed were mixed in a weight ratio of 1.26 to 1 to 100. Further, in the nickel electrode for alkaline secondary battery, a weight ratio of tungsten element to a total weight of the nickel hydroxide particles wherein the conductive layer comprising sodium-containing cobalt oxide was formed was 2 wt %.

The alkaline secondary battery of EXAMPLE 3 was fabricated in the same manner as in the EXAMPLE 1 except that the nickel electrode for alkaline secondary battery thus prepared was used for a positive electrode.

Comparative Example 1

In COMPARATIVE EXAMPLE 1, in preparation of a nickel electrode for alkaline secondary battery, powder wherein a conductive layer comprising sodium-containing cobalt oxide was formed on a surface of nickel hydroxide particles as an active material was obtained in the same manner as in the EXAMPLE 1. Afterward, a nickel electrode for alkaline secondary battery was prepared in the same manner as in the EXAMPLE 1 except that WO$_3$ powder was not added to the powder wherein the conductive layer was formed and that a 20 part by weight of aqueous solution of methyl cellulose having a concentration of 1 wt % was added as a binding agent to 100 by part by weight of the above-mentioned powder wherein the conductive layer was formed.

Further, the alkaline secondary battery of COMPARATIVE EXAMPLE 1 was fabricated in the same manner as in the EXAMPLE 1 except that the nickel electrode for alkaline secondary battery thus prepared was used for a positive electrode.

Comparative Example 2

In COMPARATIVE EXAMPLE 2, in preparation of a nickel electrode for alkaline secondary battery, nickel hydroxide powder, cobalt metal powder, and WO$_3$ powder having an average particle diameter of 1 μm which were active materials were mixed in a weight ratio of 100 to 8 to 3, to obtain a mixture. A 20 part by weight of aqueous solution of methyl cellulose having a concentration of 1 wt % was added as a binding agent to a 100 part by weight of the above-mentioned resultant mixture. Afterward, a nickel electrode for alkaline secondary battery was prepared in the same manner as in the EXAMPLE 1.

Further, the alkaline secondary battery of COMPARATIVE EXAMPLE 2 was fabricated in the same manner in the EXAMPLE 1 except that the nickel electrode for alkaline secondary battery was used for a positive electrode.

Comparative Example 3

In COMPARATIVE EXAMPLE 3, in preparation of a nickel electrode for alkaline secondary battery, powder wherein a conductive layer comprising sodium-containing cobalt oxide was formed on a surface of nickel hydroxide particles as an active material was obtained in the same manner as in the EXAMPLE 1. Further, the treatment by an aqueous solution of sodium hydroxide was not performed to the above-mentioned powder. Afterward, a nickel electrode for alkaline secondary battery was prepared in the same manner as in the EXAMPLE 1 except that powder wherein a layer of cobalt hydroxide was formed on the surface of the nickel hydroxide particles, WO$_3$ powder having an average particle diameter of 1 μm were mixed in a weight ratio of 100 to 2.52. Afterward, a nickel electrode for alkaline secondary battery was prepared in the same manner in the EXAMPLE 1.

Further, the alkaline secondary battery of COMPARATIVE EXAMPLE 3 was fabricated except that the nickel electrode for alkaline secondary battery thus prepared was used for a positive electrode.

As to each of the alkaline secondary batteries of EXAMPLES 1 to 3 and COMPARATIVE EXAMPLES 1 to 3 thus fabricated, it was charged at a charge current of 100 mA for 16 hours under the temperature conditions of 25° C., and then, was discharged at a discharge current of 1000 mA to 1.0 V. 5 cycles of charge/discharge were performed in a cycle of the above-mentioned charge/discharge process, so as to determine discharge capacity at the fifth cycle of each of the alkaline secondary batteries of EXAMPLES 1 to 3 and COMPARATIVE EXAMPLES 1 to 3.

Further, a relative index of discharge capacity in each of the alkaline secondary batteries of EXAMPLES 1 to 3 and COMPARATIVE EXAMPLES 1 to 3 was shown as capacity characteristic in the following table 1, letting discharge capacity at the fifth cycle of the alkaline secondary battery of the EXAMPLE 1 100.

As to each of the alkaline secondary batteries of EXAMPLES 1 to 3 and COMPARATIVE EXAMPLES 1 to 3 wherein 5 cycles of charge/discharge were performed as described above, it was charged for 2 hours at a charge current of 500 mA under high temperature conditions of 60° C., and then, was discharged at a discharge current of 500 mA to 1.0 V. A charge/discharge cycle test was performed in a cycle of the above-mentioned charge/discharge process, so as to determine a number of cycles until discharge capacity of each battery fell to not more than 80% of discharge capacity at the first cycle under the high temperature conditions of 60° C.

Further, a relative index of a number of cycles in each of the alkaline secondary batteries of EXAMPLES 1 to 3 and COMPARATIVE EXAMPLES 1 to 3 was shown as charge/discharge cycle performance in the following Table 1, letting a number of cycles of the alkaline secondary battery of the EXAMPLE 1 100.

TABLE 1

| | type of conductive agent | type of additive agent | cycle characteristic | charge/ discharge cycle performance |
|---|---|---|---|---|
| EXAMPLE 1 | sodium-containing Co oxide | WO$_3$ | 100 | 100 |
| EXAMPLE 2 | sodium-containing Co oxide | W | 100 | 103 |
| EXAMPLE 3 | sodium-containing Co oxide | WO$_3$ + W | 100 | 103 |
| COMPARATIVE EXAMPLE 1 | sodium-containing Co oxide | — | 98 | 58 |
| COMPARATIVE EXAMPLE 2 | cobalt metal | WO$_3$ | 86 | 47 |
| COMPARATIVE EXAMPLE 3 | cobalt hydroxide | WO$_3$ | 87 | 50 |

As apparent from Tables 1, in each of the alkaline secondary batteries of EXAMPLES 1 to 3 using for the positive electrode the nickel electrode for alkaline secondary battery wherein the conductive layer comprising sodium-containing cobalt oxide was formed on the surface of the nickel hydroxide particles as the active material as well as tungsten powder and/or tungsten compound powder was added to the nickel hydroxide particles, charge/discharge cycle performance under high temperature conditions was extremely improved, compared to in each of the alkaline secondary batteries of COMPARATIVE EXAMPLES 1 to 3.

Examples A1 to A4

In EXAMPLES A1 to A4, in preparation of a nickel electrode for alkaline secondary battery, powder wherein a layer of cobalt hydroxide was formed on a surface of nickel hydroxide particles as an active material in the same manner as in the EXAMPLE 1. Further, in formation of a conductive layer comprising sodium-containing oxides on the surface of the nickel hydroxide particles with treatment by using an aqueous solution of sodium hydroxide the above-mentioned powder wherein a layer of cobalt hydroxide was formed, instead of the above-mentioned 25 wt % of aqueous solution of sodium hydroxide, a 5 wt % of aqueous solution of sodium hydroxide was used in EXAMPLE A1, a 10 wt % of aqueous solution of sodium hydroxide in EXAMPLE A2, a 40 wt % of aqueous solution of sodium hydroxide in EXAMPLE A3, and a 45 wt % of aqueous solution of sodium hydroxide in EXAMPLE A4. Each of the nickel electrodes of alkaline secondary batteries was prepared in the same manner as in the EXAMPLE 1 except that each of the aqueous solutions of sodium hydroxide containing sodium hydroxide in the concentrations as shown above was used.

In order to determine each weight ratio of sodium in the conductive layer comprising sodium-containing cobalt oxides as formed above, a 5 wt % of aqueous solution of sodium hydroxide, a 10 wt % of aqueous solution of sodium hydroxide, a 40 wt % of aqueous solution of sodium hydroxide, and a 45 wt % of aqueous solution of sodium hydroxide were respectively mixed with cobalt hydroxide powder in a weight ratio of 10 to 1. Afterward, the respective resultant mixture thus prepared was heat-treated for 5 hours at the temperature of 90° C., was rinsed, and then, was dried at the temperature of 60° C., to prepare each of sodium-containing cobalt oxides respectively. As to each of the sodium-containing cobalt oxides thus prepared, a weight ratio of sodium was determined by atom extinction analysis. The weight ratio was 0.05 wt % in EXAMPLE A1, 0.1 wt % in EXAMPLE A2, 10 wt % in EXAMPLE A3, and the 12 wt % in EXAMPLE A4.

Further, each of alkaline secondary batteries of EXAMPLES A1 to A4 was fabricated in the same manner as in the EXAMPLE 1 except that each of the nickel electrodes for alkaline secondary battery thus prepared was used for a positive electrode.

As to each of the alkaline secondary batteries of EXAMPLES A1 to A4 thus fabricated, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until discharge capacity of each battery fell to not more than 80% of discharge capacity at the first cycle under high temperature conditions of 60° C. in the same manner as in the EXAMPLE 1.

Further, relative indexes of discharge capacity and a number of cycles in each of the alkaline secondary batteries of EXAMPLES A1 to A4 are shown as discharge characteristic and charge/discharge cycle performance in the following Table 2, letting discharge capacity and a number of cycles at the fifth cycle in the alkaline secondary battery of the EXAMPLE 1 100.

TABLE 2

|  | weight ratio of sodium in sodium-containing Co oxide (wt %) | capacity characteristic | charge/discharge cycle performance |
|---|---|---|---|
| EXAMPLE A1 | 0.05 | 89 | 65 |
| EXAMPLE A2 | 0.1 | 95 | 92 |
| EXAMPLE 1 | 1 | 100 | 100 |
| EXAMPLE A3 | 10 | 99 | 99 |
| EXAMPLE A4 | 12 | 89 | 75 |

Apparent from Table 2, in each of the alkaline secondary batteries of EXAMPLES 1, A2, and A3 using the nickel electrode for alkaline secondary battery provided with the conductive layer wherein a weight ratio of sodium element in the sodium-containing cobalt oxide is in the range of 0.1 to 10 wt %, capacity characteristic and charge/discharge cycle performance under high temperature conditions are improved, compared to in each of the alkaline secondary batteries of EXAMPLES A1 and A4 using the nickel electrode for alkaline secondary battery provided with the conductive layer wherein the weight ratio of sodium element is out of the above-mentioned range.

Examples B1 to B4

In EXAMPLES B1 to B4, in preparation of a nickel electrode for alkaline secondary battery, a weight ratio of cobalt sulfate in a 1 liter of aqueous solution of cobalt sulfate in the EXAMPLE 1 was changed. More specifically, the weight ratio of cobalt sulfate was 1.31 g. in EXAMPLE B1, 2.63 g. in EXAMPLE B2, 26.3 g. in EXAMPLE B3, and 31.6 g. in EXAMPLE B4. Each of the alkaline secondary batteries was fabricated in the same manner as in the EXAMPLE A1 except that the above-mentioned weight ratio of cobalt sulfate was used.

In each of the nickel electrodes for alkaline secondary battery thus prepared, a weight ratio of cobalt element in a conductive layer comprising sodium-containing cobalt oxide and formed on a surface of nickel hydroxide particles as an active material is 0.5 wt % of the nickel hydroxide particles as the active material in EXAMPLE B1, 1.0 wt % in EXAMPLE B2, 10 wt % in EXAMPLE B3, and 12 wt % in EXAMPLE B4, as shown in the following Table 3.

Further, each of the alkaline secondary batteries of EXAMPLES B1 to B4 was fabricated in the same manner as in the EXAMPLE 1 except that each of the nickel electrodes for alkaline secondary battery thus prepared was used for a positive electrode.

As to each of the alkaline secondary batteries of EXAMPLES B1 to B4 thus fabricated as described above, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until the discharge capacity of each battery fell to not more than 80% of the discharge capacity at the first cycle under high temperature conditions of 60° C. in the same manner as in the EXAMPLE 1.

Further, relative indexes of discharge capacity and a number of cycles in each of the alkaline secondary batteries of EXAMPLES B1 to B4 are shown as capacity characteristic and charge/discharge cycle performance in the following Table 3, letting discharge capacity and a number of cycles at the fifth cycle in the alkaline secondary battery of the EXAMPLE 1 100.

TABLE 3

|  | ratio of Co to active material particles (wt %) | capacity characteristic | charge/ discharge cycle performance |
|---|---|---|---|
| EXAMPLE B1 | 0.5 | 90 | 74 |
| EXAMPLE B2 | 1 | 98 | 98 |
| EXAMPLE 1 | 4 | 100 | 100 |
| EXAMPLE B3 | 10 | 95 | 100 |
| EXAMPLE B4 | 12 | 89 | 100 |

Apparent from Table 3, in each of the alkaline secondary batteries of EXAMPLES 1, B2, and B3 using the nickel electrode for alkaline secondary battery wherein a weight ratio of cobalt element in the conductive layer comprising sodium-containing cobalt oxide is in the range of 1 to 10 wt % of nickel hydroxide particles as the active material, capacity characteristic and charge/discharge cycle performance under high temperature conditions are improved, compared to in the alkaline secondary battery of EXAMPLE B1 using the nickel electrode for alkaline secondary battery wherein the weight ratio of cobalt element was 0.5 wt %. Further, capacity characteristic is improved, compared to in the alkaline secondary battery of EXAMPLE B4 using the nickel electrode for alkaline secondary battery wherein the weight ratio of cobalt element is 12 wt %.

Examples C1 to C6

In EXAMPLES C1 to C6, in preparation of a nickel electrodes for alkaline secondary battery, powder wherein a conductive layer comprising sodium-containing cobalt oxide was formed on a surface of nickel hydroxide particles as an active material was obtained in the same manner as in the EXAMPLE 1. Afterward, in mixing $WO_3$ powder having an average particle diameter of 1 $\mu$m with the above-mentioned powder wherein the conductive layer was formed, a weight ratio of the powder wherein the conductive layer was formed and the $WO_3$ powder having an average particle diameter of 1 $\mu$m was set 100 to 0.01 in EXAMPLE C1, 100 to 0.06 in EXAMPLE C2, 100 to 0.25 in EXAMPLE C3, 100 to 3.8 in EXAMPLE C4, 100 to 5.0 in EXAMPLE C5, and 100 to 6.3 in EXAMPLE C6. Each of the alkaline secondary batteries of EXAMPLE C1 to C6 was fabricated in the same manner as in the EXAMPLE 1 except that the powder wherein the conductive layer was formed and the $WO_3$ powder were mixed in the weight ratio as shown above.

In each of the nickel electrodes for alkaline secondary battery thus prepared, a weight ratio of tungsten element to a total weight of nickel hydroxide particles wherein the conductive layer comprising sodium-containing cobalt oxide was formed was determined. The weight ratio is 0.01 wt % in EXAMPLE C1, 0.05 wt % in EXAMPLE C2, 0.2 wt % in EXAMPLE C3, 3 wt % in EXAMPLE C4, 4 wt % in EXAMPLE C5, and 5 wt % in EXAMPLE C6, as shown in the following Table 4.

Each of the alkaline secondary batteries of EXAMPLES C1 to C6 was fabricated in the same manner as in the EXAMPLE 1 except that each of the nickel electrodes for alkaline secondary battery thus prepared was used for a positive electrode.

As to each of the alkaline secondary batteries of EXAMPLES C1 to C6 thus fabricated as described above, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until discharge capacity of each battery fell to not more than 80% of discharge capacity at the first cycle under high temperature conditions of 60° C., in the same manner as in the EXAMPLE 1.

Further, relative indexes of discharge capacity and a number of cycles in each of the alkaline secondary batteries of EXAMPLES C1 to C6 are shown as capacity characteristic and charge/discharge cycle performance in the following Table 4, letting discharge capacity and a number of cycles at the fifth cycle in the alkaline secondary battery of the EXAMPLE 1 100.

TABLE 4

|  | ratio of W in active material particles having conductive layer formed thereon (wt %) | capacity characteristic | charge/ discharge cycle performance |
|---|---|---|---|
| EXAMPLE C1 | 0.01 | 100 | 89 |
| EXAMPLE C2 | 0.05 | 100 | 90 |
| EXAMPLE C3 | 0.2 | 100 | 95 |
| EXAMPLE 1 | 2 | 100 | 100 |
| EXAMPLE C4 | 3 | 98 | 100 |
| EXAMPLE C5 | 4 | 97 | 100 |
| EXAMPLE C6 | 5 | 89 | 100 |

Apparent from Table 4, in each of alkaline secondary batteries of EXAMPLES 1, and C3 to C5 using the nickel electrode for alkaline secondary battery wherein a weight ratio of tungsten element to a total weight of hydroxide nickel particles wherein the conductive layer comprising sodium-containing cobalt oxide is formed is 0.2 to 4 wt %, charge/discharge cycle performance under high temperature conditions is improved, compared to in alkaline secondary battery of EXAMPLE C1 using the nickel electrode for alkaline secondary battery wherein the weight ratio of tungsten element is 0.01 wt % and in the alkaline secondary battery of EXAMPLE C2 using the nickel electrode for alkaline secondary battery wherein the weight ratio is 0.05 wt %. In addition, it is to be noted that capacity characteristic is also improved, compared to in the alkaline secondary battery of EXAMPLE C6 using the nickel electrode for alkaline secondary battery wherein the weight ratio of tungsten element is 5 wt %.

Examples D1 to D6

In EXAMPLES D1 to D6, in preparation of a nickel electrode for alkaline secondary battery, powder wherein a conductive layer comprising sodium-containing cobalt oxide was formed on a surface of nickel hydroxide particles as an active material was obtained in the same manner as in the EXAMPLE 1. Afterward, in mixing the powder wherein the conductive layer was formed and $WO_3$ powder in a weight ratio of 100 to 2.52, the $WO_3$ powder different in an average particle diameter was used. More specifically, as shown in the following Table 5, the $WO_3$ powder having an average particle diameter of 0.1 $\mu$m was used in EXAMPLE D1, the $WO_3$ powder having an average particle diameter of 10 $\mu$m in EXAMPLE D2, the $WO_3$ powder having an average particle diameter of 20 $\mu$m in EXAMPLE D3, the $WO_3$ powder having an average particle diameter of 50 $\mu$m in EXAMPLE D4, the $WO_3$ powder having an average particle diameter of 100 μm in EXAMPLE D5, and the WO$_3$ powder having an average particle diameter of 150 μm in EXAMPLE D6. Each of the nickel electrodes for alkaline secondary battery was prepared in the same manner as in the EXAMPLE 1 except that the WO$_3$ powder having the above-mentioned average particle diameters was used.

Each of alkaline secondary batteries of EXAMPLES D1 to D6 was fabricated in the same manner as in the EXAMPLE 1 except that each of the nickele lectrodes for alkaline secondary battery thus prepared was used for a positive electrode.

As to each of the alkaline secondary batteries of EXAMPLES D1 to D6 thus fabricated as described above, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until discharge capacity of each battery fell to not more than 80% of discharge capacity at the first cycle under high temperature conditions of 60° C., in the same manner as in the EXAMPLE 1.

Further, relative indexes of discharge capacity and a number of cycles in each of the alkaline secondary batteries of EXAMPLES D1 to D6 are shown as discharge characteristic and charge/discharge cycle performance in the following Table 5, letting discharge capacity and a number of cycles at the fifth cycle of the alkaline secondary battery of the EXAMPLE 1 100.

TABLE 5

| | average particle diameter of WO$_3$ particles (μm) | capacity characteristic | charge/discharge cycle performance |
| --- | --- | --- | --- |
| EXAMPLE D1 | 0.1 | 100 | 100 |
| EXAMPLE 1 | 1 | 100 | 100 |
| EXAMPLE D2 | 10 | 100 | 100 |
| EXAMPLE D3 | 20 | 99 | 100 |
| EXAMPLE D4 | 50 | 98 | 100 |
| EXAMPLE D5 | 100 | 98 | 96 |
| EXAMPLE D6 | 150 | 97 | 82 |

Apparent from Table 5, in each of the alkaline secondary batteries of EXAMPLES 1 and D1 to D5 using each of the nickel electrodes for alkaline secondary battery wherein the WO$_3$ powder having an average particle diameter of not more than 100 μm was added to the nickel hydroxide particles wherein the conductive layer comprising sodium-containing cobalt oxide is formed, charge/discharge cycle performance under high temperature conditions was improved, compared to in the alkaline secondary battery of EXAMPLE D6 using the nickel electrode for alkaline secondary battery wherein the WO$_3$ powder having an average particle diameter of 150 μm is added to the above-mentioned powder.

Examples E1 to E13

In EXAMPLES E1 to E13, in preparation of a nickel electrode for alkaline secondary battery, powder wherein a conductive layer comprising sodium-containing cobalt oxide was formed on a surface of nickel hydroxide powder as an active material was obtained. Further, 2.52 part by weight of WO$_3$ powder having an average particle diameter of 1 μm was added to 100 part by weight of the powder wherein the conductive layer was formed. Additionally, 1.27 part by weight of Y$_2$O$_3$ powder was added in EXAMPLE E1, 1 part by weight of Y powder in EXAMPLE E2, 1.57 part by weight of Y(OH)$_3$ powder in EXAMPLE E3, 1.14 part by weight of Yb$_2$O$_3$ powder in EXAMPLE E4, 1.84 part by weight of Ca(OH)$_2$ powder in EXAMPLE E5, 2.89 part by weight of Al(OH)$_3$ powder in EXAMPLE E6, 1.14 part by weight of Er$_2$O$_3$ powder in EXAMPLE E7, 1.15 part by weight of Gd$_2$O$_3$ powder in EXAMPLE E8, 1.14 part by weight of Tm$_2$O$_3$ powder in EXAMPLE E9, 1.14 part by weight of Lu$_2$O$_3$ in EXAMPLE E10, 1.24 part by weight of ZnO powder in EXAMPLE E11, 1.43 part by weight of Nb$_2$O$_5$ in EXAMPLE E12, and 0.63 part by weight of Y$_2$O$_3$ powder and 0.72 part by weight of Nb$_2$O$_5$ in EXAMPLE E13.

In the case where the WO$_3$ powder and each of the above-mentioned compound powder were mixed with the powder wherein the conductive layer comprising sodium-containing cobalt oxide was formed on the surface of the nickel hydroxide particles as described above, a weight ratio of tungsten (W) in the WO$_3$ powder to a total weight of nickel hydroxide particles wherein the conductive layer was formed was 2 wt %.

Further, a weight ratio of each element (M1) of yttrium (Y), ytterbium (Yb), calcium (Ca), aluminum (Al), erbium (Er), gadolinium(Gd), thulium(Tm), lutetium(Lu), zinc (Zn), niobium (Nb) in each of the compounds thus added as described above, is shown in the following Table 6(a) and (b). A weight ratio of each element (M1) in EXAMPLES E1 to E12 is respectively 1 wt %. A weight ratio of each element of yttrium (Y) and niobium (Nb) is respectively 0.5 wt %, summing up to 1 wt % for both elements.

Each of the nickel electrodes for alkaline secondary battery was prepared in the same manner as in the EXAMPLE 1 except that each powder in the above-mentioned compounds was mixed with the powder wherein the conductive layer was formed. In addition, each of the alkaline secondary batteries of EXAMPLES E1 to E13 was fabricated in the same manner in the EXAMPLE 1 except that each of the nickel electrodes thus prepared was used for a positive electrode.

As to each of the alkaline secondary batteries of EXAMPLES E1 to E13 thus fabricated as described above, charge/discharge was repeatedly performed under temperature conditions of 25° C., to determine discharge capacity at the fifth cycle. Afterward, discharge capacity was repeatedly performed under high temperature conditions of 60° C., so as to determine a number of cycles until discharge capacity of each battery fell to not more than 80% of discharge capacity at the first cycle under high temperature conditions of 60° C., in the same manner as in the EXAMPLE 1.

Further, relative indexes of discharge capacity and a number of cycles in each of the alkaline secondary batteries of EXAMPLES E1 to E13 were shown as capacity characteristic and discharge/charge cycle performance in the following Table 6(a) and (b), letting discharge capacity and a number of cycles at the fifth cycle in the alkaline secondary battery of the EXAMPLE 1 100.

TABLE 6a

| | type of additive except for WO$_3$ | type of M1 | weight ratio of M1 (wt %) |
| --- | --- | --- | --- |
| EXAMPLE E1 | Y$_2$O$_3$ | Y | 1 |
| EXAMPLE E2 | Y | Y | 1 |
| EXAMPLE E3 | Y(OH)$_3$ | Y | 1 |
| EXAMPLE E4 | Yb$_2$O$_3$ | Yb | 1 |
| EXAMPLE E5 | Ca(OH)$_2$ | Ca | 1 |

TABLE 6a-continued

|  | type of additive except for WO$_3$ | type of M1 | weight ratio of M1 (wt %) |
|---|---|---|---|
| EXAMPLE E6 | Al(OH)$_3$ | Al | 1 |
| EXAMPLE E7 | Er$_2$O$_3$ | Er | 1 |
| EXAMPLE E8 | Gd$_2$O$_3$ | Gd | 1 |
| EXAMPLE E9 | Tm$_2$O$_3$ | Tm | 1 |
| EXAMPLE E10 | Lu$_2$O$_3$ | Lu | 1 |
| EXAMPLE E11 | ZnO | Zn | 1 |
| EXAMPLE E12 | Nb$_2$O$_5$ | Nb | 1 |
| EXAMPLE E13 | Y$_2$O$_3$ Nb$_2$O$_5$ | Y Nb | 0.5 0.5 |
| EXAMPLE 1 | — | — | — |

TABLE 6b

|  | capacity characteristic | charge/ discharge cycle performance |
|---|---|---|
| EXAMPLE E1 | 100 | 123 |
| EXAMPLE E2 | 100 | 119 |
| EXAMPLE E3 | 100 | 119 |
| EXAMPLE E4 | 99 | 110 |
| EXAMPLE E5 | 100 | 108 |
| EXAMPLE E6 | 100 | 108 |
| EXAMPLE E7 | 100 | 111 |
| EXAMPLE E8 | 99 | 107 |
| EXAMPLE E9 | 98 | 112 |
| EXAMPLE E10 | 98 | 112 |
| EXAMPLE E11 | 100 | 113 |
| EXAMPLE E12 | 100 | 115 |
| EXAMPLE E13 | 100 | 117 |
| EXAMPLE 1 | 100 | 100 |

Apparent from Table 6(a) and (b), in each of the alkaline secondary batteries of EXAMPLES E1 to E13 using the nickel electrode for alkaline secondary battery wherein Y$_2$O$_3$ powder and the like are added together with WO$_3$ powder to the nickel hydroxide particles wherein the conductive layer comprising sodium-containing cobalt oxide is formed, charge/discharge cycle performance under high temperature conditions is more improved, compared to in the alkaline secondary battery of the EXAMPLE 1. Especially, in each of the alkaline secondary batteries of EXAMPLES E1 to E3 and E13 wherein yttrium (Y) powder or yttrium compound powder is added, charge/discharge cycle performance under high temperature conditions is more improved. In particular, in the alkaline secondary battery of EXAMPLE E1 wherein the Y$_2$O$_3$ powder is added, charge/discharge cycle performance under high temperature conditions is the most improved.

Examples E1.1 to E1.8

In EXAMPLES E1.1 to E1.8, in preparation of a nickel electrode for alkaline secondary battery, powder wherein a conductive layer comprising sodium-containing cobalt oxide was formed on a surface of nickel hydroxide powder as an active material was obtained. Further, Y$_2$O$_3$ powder was mixed together with WO$_3$ powder having an average particle diameter of 1 μm with the powder wherein the conductive layer was formed in the same manner as in the EXAMPLE E1.

In EXAMPLES E1.1 to E1.8, in mixing the Y$_2$O$_3$ powder together with the WO$_3$ powder having an average particle diameter of 1 μm with the powder wherein the conductive layer was formed, weight ratios of the Y$_2$O$_3$ powder and the WO$_3$ powder to be added in EXAMPLE E1 were changed. More specifically, each of weight ratios of tungsten element and yttrium element to a total weight of nickel hydroxide particles wherein the conductive layer was formed was 0.05 wt % respectively, summing up to 0.1 wt % for both elements in EXAMPLE E1.1, 0.1 wt % respectively, summing up to 0.2 wt % for both elements in EXAMPLE E1.2, 0.2 wt % respectively, summing up to 0.4 wt % for both elements in the EXAMPLE E1.3, 0.3 wt % respectively, summing up to 0.6 wt % for both elements in EXAMPLE E1.4, 0.5 wt % respectively, summing up to 1 wt % for both elements in EXAMPLE E1.5, 1 wt % respectively, summing up to 2 wt % for both elements in EXAMPLE E1.6, 2 wt % respectively, summing up to 4 wt % for both elements in EXAMPLE E1.7, and 0.3 wt % respectively, summing up to 0.6 wt % for both elements in EXAMPLE E1.8.

Further, each of the nickel electrodes for alkaline secondary battery was prepared in the same manner as in the EXAMPLE 1 except that the WO$_3$ powder and the Y$_2$O$_3$ powder which contain the above-mentioned weight ratios of tungsten element (W) and yttrium element (Y) were mixed with the powder wherein the conductive layer was formed. In addition, each of alkaline secondary batteries of EXAMPLE E1.1 to E1.8 was fabricated in the same manner as in the EXAMPLE 1 except that each of the nickel electrodes for alkaline secondary battery thus prepared was used for a positive electrode.

As to each of the alkaline secondary batteries of EXAMPLES E1.1 to E1.8 thus fabricated as described above, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until discharge capacity of each battery fell to not more than 80% of discharge capacity at the first cycle under high temperature conditions of 60° C. in the same manner as in the EXAMPLE 1.

Further, relative indexes of discharge capacity and a number of cycles in each of the alkaline secondary batteries of EXAMPLES 1.1 to 1.8 were shown as capacity characteristic and charge/discharge cycle performance in the following Table 7(a) and (b), letting a number of cycles at the fifth cycle in the alkaline secondary battery of the EXAMPLE 1 100.

TABLE 7a

|  | ratio of W (wt %) | ratio of Y (wt %) | ratio of W + Y (wt %) |
|---|---|---|---|
| EXAMPLE E1.1 | 0.05 | 0.05 | 0.1 |
| EXAMPLE E1.2 | 0.1 | 0.1 | 0.2 |
| EXAMPLE E1.3 | 0.2 | 0.2 | 0.4 |
| EXAMPLE E1.4 | 0.3 | 0.3 | 0.6 |
| EXAMPLE E1.5 | 0.5 | 0.5 | 1 |
| EXAMPLE E1.6 | 1 | 1 | 2 |
| EXAMPLE E1.7 | 2 | 2 | 4 |
| EXAMPLE E1.8 | 3 | 3 | 6 |
| EXAMPLE E1 | 2 | 1 | 3 |
| EXAMPLE 1 | 2 | — | 2 |

TABLE 7b

|  | capacity characteristic | charge/ discharge cycle performance |
|---|---|---|
| EXAMPLE E1.1 | 100 | 86 |
| EXAMPLE E1.2 | 100 | 97 |
| EXAMPLE E1.3 | 100 | 119 |
| EXAMPLE E1.4 | 100 | 123 |
| EXAMPLE E1.5 | 100 | 126 |
| EXAMPLE E1.6 | 100 | 123 |
| EXAMPLE E1.7 | 96 | 121 |
| EXAMPLE E1.8 | 91 | 115 |
| EXAMPLE E1 | 100 | 123 |
| EXAMPLE 1 | 100 | 100 |

Apparent from Table 7(a) and (b), in adding the $WO_3$ powder and the $Y_2O_3$ powder to the nickel hydroxide particles wherein the conductive layer comprising sodium-containing cobalt oxide is formed, when a total weight ratio of tungsten element (W) and yttrium element (Y) to the nickel hydroxide particles wherein the conductive layer is formed is not more than 0.1 wt %, charge/discharge cycle performance under high temperature conditions is degraded. On the other hand, when the total weight ratio of tungsten element (W) and yttrium element (Y) is not less than 6 wt %, capacity characteristic is degraded.

Therefore, in the case where the $WO_3$ powder and the $Y_2O_3$ powder are mixed with the nickel hydroxide particles wherein the conductive layer comprising sodium-containing cobalt oxide is formed, it is preferable that a total weight ratio of tungsten element (W) and yttrium element (Y) to the nickel hydroxide particles wherein the conductive layer is formed is set in the range of 0.2 to 4 wt %. Further, it is more preferable that the total weight ratio of tungsten element (W) and yttrium element (Y) is set in the range of 0.6 to 3 wt %.

Examples F1 to F12

In EXAMPLES F1 to R12, in preparation of a nickel electrode for alkaline secondary battery, 9.71 g. of aluminum sulfate was added to 167 g. of nickel sulfate in EXAMPLE F1, 8.6 g. of manganese sulfate in EXAMPLE F2, 8.8 g. of cobalt sulfate in EXAMPLE F3, 9.20 g. of zinc sulfate in EXAMPLE F4, 9.30 g. of calcium sulfate in EXAMPLE F5, 6.83 g. of magnesium sulfate in EXAMPLE F6, 13.04 g. of yttrium sulfate in EXAMPLE F7, 17.98 g. of ytterbium sulfate in EXAMPLE F8, 18.0 g. of manganese sulfate in EXAMPLE F9, 22.2 g. of manganese sulfate in EXAMPLE F10, 4.2 g. of manganese sulfate and 4.28 g. of cobalt sulfate in EXAMPLE F11, and 4.28 g. of cobalt sulfate and 4.6 g. of zinc sulfate in EXAMPLE F12.

Further, each of 5 liters of aqueous solutions having each of the above-mentioned elements and 167 g. of nickel sulfate included as solid solution therein was dropped with a 5 wt % of aqueous solution of ammonia and a 10 wt % of aqueous solution of sodium hydroxide, to prepare a mixture. A resultant mixture was reacted with the pH thereof kept 11. Afterward, precipitation was filtered, was rinsed, and was dried, to obtain nickel hydroxide powder wherein each of the elements (M2) of Al, Mn, Co, Zn, Ca, Mg, Y, and Yb was included as solid solution into nickel hydroxide.

A ratio of each of the elements (M2) of Al, Mn, Co, Zn, Ca, Mg, Y, and Yb to a total weight of nickel (Ni) in nickel hydroxide and each of the elements (M2) included as solid solution is respectively 5% by atom in EXAMPLES F1 to F8, 10% by atom in EXAMPLE F9, and 10% by atom in EXAMPLE F10. Additionally, a ratio of Mn is 2.5% by aom and Co 2.5% by atom in EXAMPLE F11, and Co 2.5% by atom and Zn 2.5% by atom in the EXAMPLE 11, as shown in the following Table 8.

Each of nickel electrodes for alkaline secondary battery was prepared in the same manner as in the EXAMPLE 1 except that the nickel hydroxide powder having each of the above-mentioned elements (M2) included as solid solution therein was used. Additionally, each of the alkaline secondary batteries of the EXAMPLES F1 to F12 was fabricated in the same manner as in the EXAMPLE 1 except that each of the nickel electrodes for alkaline secondary batteries thus prepared was used for a positive electrode.

As to each of the alkaline secondary batteries of the EXAMPLES F1 to F12 thus fabricated, charge/discharge was repeatedly performed under temperature conditions of 25° C., to determine discharge capacity at the fifth cycle. Afterward, charge/discharge was performed under high temperature conditions of 60° C., so as to determine a number of cycles until discharge capacity of each battery fell to not more than 80% of discharge capacity at the first cycle under the high temperature conditions of 60° C. in the same manner as in the EXAMPLE 1.

Further, relative indexes of discharge capacity and a number of cycles in each of the alkaline secondary batteries of the EXAMPLES F1 to 12 were shown as capacity characteristic and charge/discharge cycle performance in the following Table 8, letting a number of cycles in the alkaline secondary battery of the EXAMPLE 1 100.

TABLE 8

|  | type of M2 | ratio of M2/(Ni + M2) (% by atom) | capacity characteristic | charge/ discharge cycle performance |
|---|---|---|---|---|
| EXAMPLE F1 | Al | 5 | 100 | 110 |
| EXAMPLE F2 | Mn | 5 | 98 | 110 |
| EXAMPLE F3 | Co | 5 | 100 | 113 |
| EXAMPLE F4 | Zn | 5 | 100 | 113 |
| EXAMPLE F5 | Ca | 5 | 100 | 109 |
| EXAMPLE F6 | Mg | 5 | 98 | 108 |
| EXAMPLE F7 | Y | 5 | 100 | 110 |
| EXAMPLE F8 | Yb | 5 | 100 | 109 |
| EXAMPLE F9 | Mn | 10 | 97 | 111 |
| EXAMPLE F10 | Mn | 12 | 88 | 110 |
| EXAMPLE F11 | Mn Co | 2.5 2.5 | 100 | 111 |
| EXAMPLE F12 | Co Zn | 2.5 2.5 | 100 | 116 |
| EXAMPLE 1 | — | — | 100 | 100 |

Apparent from Table 8, in each of the alkaline secondary batteries of EXAMPLES F1 to 12 using for a nickel electrode for alkaline secondary battery nickel hydroxide powder having each of the elements (M2) included as solid solution therein, charge/discharge cycle performance under high temperature conditions is improved, compared to in the alkaline secondary battery of the EXAMPLE 1. However, as to the alkaline secondary battery of EXAMPLE F10 wherein a weight ratio of the element (M2), which is Mn, is large, capacity characteristic is degraded.

Examples G1 to G12

In EXAMPLES G1 to G12, each of alkaline secondary batteries of EXAMPLES G1 to G12 was fabricated in the same manner as in the EXAMPLE 1 except that the type of alkaline electrode solution to be used in the alkaline secondary battery of the EXAMPLE 1 was changed.

In EXAMPLES G1 to G12, weight ratios of KOH, NaOH, and LiOH.H$_2$O to be included as solid solution into a 1 liter of alkaline electrode solution in the EXAMPLE 1 were changed. More specifically, an amount of KOH was 336.6 g., an amount of NaOH was 20 g., and an amount of LiOH.H$_2$O was 0.42 g in the EXAMPLE G1, KOH 336.6 g., NaOH 20 g., and LiOH.H$_2$O 4.19 g, in EXAMPLE G2, KOH 336.6 g., NaOH 20 g., and LiOH.H$_2$O 83.8 g, in EXAMPLE G3, KOH 336.6 g., NaOH 20 g., and LiOH.H$_2$O 92 g, in EXAMPLE G4, KOH 336.6 g., NaOH 4 g., and LiOH.H$_2$O 41.9 g, in EXAMPLE G5, KOH 336.6 g., NaOH 8 g., and LiOH.H$_2$O 41.9 g, in EXAMPLE G6, KOH 336.6 g., NaOH 160 g., and LiOH.H$_2$O 41.9 g, in EXAMPLE G7, KOH 336.6 g., NaOH 168 g., and LiOH.H$_2$O 41.9 g, in EXAMPLE G8, KOH 168.3 g., NaOH 20 g., and LiOH.H$_2$O 41.9 g, in EXAMPLE G9, KOH 224.4 g., NaOH 20 g., and LiOH.H$_2$O 41.9 g, in EXAMPLE G10, KOH 561 g., NaOH 20 g., and LiOH.H$_2$O 41.9 g, in EXAMPLE G11, and KOH 673.2 g., NaOH 20 g., and LiOH.H$_2$O 41.9 g, in EXAMPLE G12. Each of the concentrations (mol/l) of KOH, NaOH, and LiOH in the alkaline electrolyte solution used in EXAMPLES G1 to G12 was shown in the following EXAMPLE 9.

As to each of the alkaline secondary batteries of EXAMPLES G1 to G12 thus fabricated as described above, charge/discharge was repeatedly performed under temperature conditions of 25° C., to determine discharge capacity at the fifth cycle. Afterward, charge/discharge was repeatedly performed under high temperature conditions of 60° C., so as to determine a number of cycles until discharge capacity of each battery fell to not more than 80% of discharge capacity at the first cycle under high temperature conditions of 60° C., in the same manner as in the EXAMPLE 1.

Further, relative indexes of discharge capacity and a cycle of numbers in each of the alkaline secondary batteries of EXAMPLES G1 to G12 were shown as capacity characteristic and charge/discharge cycle performance in the following Table 9(a) and (b), letting discharge capacity and a number of cycles at cycles 5 in the alkaline secondary battery of the EXAMPLE 1 100.

TABLE 9a

|  | concentration of KOH (mol/l) | concentration of NaOH (mol/l) | concentration of LiOH (mol/l) |
|---|---|---|---|
| EXAMPLE 1 | 6.0 | 0.5 | 1.0 |
| EXAMPLE G1 | 6.0 | 0.5 | 0.01 |
| EXAMPLE G2 | 6.0 | 0.5 | 0.1 |
| EXAMPLE G3 | 6.0 | 0.5 | 2.0 |
| EXAMPLE G4 | 6.0 | 0.5 | 2.2 |
| EXAMPLE G5 | 6.0 | 0.1 | 1.0 |
| EXAMPLE G6 | 6.0 | 0.2 | 1.0 |
| EXAMPLE G7 | 6.0 | 4.0 | 1.0 |
| EXAMPLE G8 | 6.0 | 4.2 | 1.0 |
| EXAMPLE G9 | 3.0 | 0.5 | 1.0 |
| EXAMPLE G10 | 4.0 | 0.5 | 1.0 |
| EXAMPLE G11 | 10.0 | 0.5 | 1.0 |
| EXAMPLE G12 | 12.0 | 0.5 | 1.0 |

TABLE 9b

|  | capacity characteristic | charge/discharge cycle performance |
|---|---|---|
| EXAMPLE 1 | 100 | 100 |
| EXAMPLE G1 | 95 | 87 |
| EXAMPLE G2 | 98 | 99 |
| EXAMPLE G3 | 100 | 103 |
| EXAMPLE G4 | 97 | 84 |
| EXAMPLE G5 | 97 | 86 |
| EXAMPLE G6 | 99 | 100 |
| EXAMPLE G7 | 101 | 101 |
| EXAMPLE G8 | 101 | 84 |
| EXAMPLE G9 | 91 | 87 |
| EXAMPLE G10 | 97 | 96 |
| EXAMPLE E11 | 102 | 98 |
| EXAMPLE E12 | 106 | 80 |

Apparent from Table 9(a) and (b), in each of the alkaline secondary batteries of the EXAMPLES 1, G2, G3, G6, G7, G10, and G11 using the alkaline electrolyte solution wherein the concentration of KOH is in the range of 4 to 10 mol/l, the concentration of NaOH in the range of 0.2 to 4 mol/l, and the concentration of LiOH in the range of 0.1 to 2 mol/l, charge/discharge cycle performance under high temperature conditions is improved, compared to in each of the alkaline secondary batteries of the EXAMPLES G1, G4, G5, G8, G9, and G12 using the alkaline electrolyte solution wherein the concentrations of KOH, NaOH, and LiOH are out of the above-mentioned ranges.

Although, the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A nickel electrode for alkaline secondary battery obtained by applying a paste containing active material particles comprising nickel hydroxide to a conductive substrate and drying the paste on the conductive substrate, wherein a conductive layer comprising sodium-containing cobalt oxide is formed on a surface of the active material particles and tungsten powder and/or tungsten compound powder is added to the active material particles.

2. The nickel electrode for alkaline secondary battery as claimed in claim 1, wherein a weight ratio of sodium element in said sodium-containing cobalt oxide is in the range of 0.1 to 10 wt %.

3. The nickel electrode for alkaline secondary battery as claimed in claim 1, wherein a weight ratio of cobalt element in the conductive layer comprising said sodium-containing cobalt oxide to the active material particles comprising nickel hydroxide is in the range of 1 to 10 wt %.

4. The nickel electrode for alkaline secondary battery as claimed in claim 1, wherein a weight ratio of tungsten element in the tungsten powder and/or the tungsten compound powder to be added to a total weight of the active material particles comprising hydroxide nickel and having the conductive layer formed thereon is in the range of 0.2 to 4 wt %.

5. The nickel electrode for alkaline secondary battery as claimed in claim 1, wherein
an average particle diameter of the tungsten powder and/or tungsten compound powder is not more than 100 μm.

6. The nickel electrode for alkaline secondary battery as claimed in claim 1, wherein
at least one element selected from the group consisting of zinc, cobalt, calcium, magnesium, aluminum, manganese, yttrium, and ytterbium is included as solid solution into the active material particles comprising nickel hydroxide.

7. The nickel electrode for alkaline secondary battery as claimed in claim 6, wherein
a ratio of the above-mentioned element to a total weight of nickel in said nickel hydroxide and the above-mentioned element is not more than 10% by atom.

8. The nickel electrode for alkaline secondary battery as claimed in claim 1, wherein
at least one element selected from zinc and cobalt is included as solid solution into the active material particles comprising nickel hydroxide.

9. The nickel electrode for alkaline secondary battery as claimed in claim 1, wherein
at least one element powder or its compound powder selected from the group consisting of yttrium, ytterbium, calcium, aluminum, erbium, gadolinium, thulium, lutetium, zinc, and niobium in addition to the tungsten powder and/or tungsten compound powder are added.

10. The nickel electrode for alkaline secondary battery as claimed in claim 1, wherein
yttrium powder or yttrium compound powder in addition to the tungsten powder and/or tungsten compound powder are added.

11. The nickel electrode for alkaline secondary battery as claimed in claim 10, wherein
said yttrium compound is $Y_2O_3$.

12. An alkaline secondary battery provided with a positive electrode, a negative electrode, and an alkaline electrolyte solution, wherein
the positive electrode is the nickel electrode for alkaline secondary battery as claimed in claim 1.

13. The alkaline secondary battery as claimed in claim 12, wherein
the alkaline electrolyte solution contains potassium, lithium, and sodium.

14. The alkaline secondary battery as claimed in claim 12, wherein
the alkaline electrolyte solution contains 4 to 10 mol/l of potassium hydroxide, 0.1 to 2 mol/l of lithium hydroxide, and 0.2 to 4 mol/l of sodium hydroxide.

* * * * *